US010066117B2

(12) United States Patent
Clifford et al.

(10) Patent No.: US 10,066,117 B2
(45) Date of Patent: Sep. 4, 2018

(54) PAPER COATINGS (71) Applicant: Avery Dennison Corporation, Glendale, CA (US)

(72) Inventors: Neil Clifford, Hampshire (GB); David W. Whitman, State College, PA (US); Ronald Wiegers, 's-Hertogenbosch (NL)

(73) Assignee: Avery Dennison Corporation, Glendale, CA (US)

( * ) Notice: Subject to any disclaimer, the term of this patent is extended or adjusted under 35 U.S.C. 154(b) by 303 days.

(21) Appl. No.: 14/861,223

(22) Filed: Sep. 22, 2015

(65) Prior Publication Data

US 2016/0083611 A1 Mar. 24, 2016

Related U.S. Application Data (60) Provisional application No. 62/053,325, filed on Sep. 22, 2014.

(51) Int. Cl.
| *C09D 133/14* | (2006.01) |
| *D21H 19/20* | (2006.01) |
| *B41M 5/52* | (2006.01) |
| *B05D 5/04* | (2006.01) |
| *D21H 19/10* | (2006.01) |
| *D21H 19/16* | (2006.01) |
| *D21H 19/24* | (2006.01) |

(52) U.S. Cl.
CPC ............. *C09D 133/14* (2013.01); *B05D 5/04* (2013.01); *B41M 5/52* (2013.01); *D21H 19/10* (2013.01); *D21H 19/16* (2013.01); *D21H 19/20* (2013.01); *D21H 19/24* (2013.01)

(58) Field of Classification Search
CPC .......... C09D 133/14; B05D 5/04; B41M 5/52; D21H 19/10; D21H 19/16; D21H 19/20; D21H 19/24
USPC ........................................................ 428/537.5
See application file for complete search history.

(56) References Cited

U.S. PATENT DOCUMENTS

| 4,636,408 A | 1/1987 | Anthony et al. |
| 5,112,890 A | 5/1992 | Behrens et al. |
| 7,871,681 B2 | 1/2011 | Scholte et al. |
| 2011/0318509 A1* | 12/2011 | Wiegers ............... B41M 5/5281 428/32.21 |
| 2014/0114010 A1* | 4/2014 | Van Casteren .... C08G 18/0823 524/507 |
| 2014/0134337 A1* | 5/2014 | Overbeek ............ C09D 11/101 427/256 |

FOREIGN PATENT DOCUMENTS

| CN | 102365176 | | 3/2016 |
| WO | 2007/071328 | | 6/2007 |
| WO | WO2007/071328 | * | 6/2007 |
| WO | 2008/101661 | | 8/2008 |
| WO | WO2008/101661 | * | 8/2008 |
| WO | 2010/091346 | | 8/2010 |
| WO | WO2010/091346 | * | 8/2010 |

OTHER PUBLICATIONS

International Search Report and Written Opinion dated Dec. 3, 2015 issued in corresponding IA No. PCT/US2015/051397 filed Sep. 22, 2015.
International Preliminary Report on Patentability dated Apr. 6, 2017 issued in corresponding IA No. PCT/US2015/051397 filed Sep. 22, 2015.

* cited by examiner

*Primary Examiner* — Leszek Kiliman
(74) *Attorney, Agent, or Firm* — Avery Dennison Corporation (57) ABSTRACT

Paper coatings, coated papers, and printed coated papers are described. The coatings promote adhesion and retention of UV curable printing media such as UV curable inks. Also described are systems and processes for forming the coated papers and printed coated papers.

20 Claims, 2 Drawing Sheets

PAPER COATINGS

CROSS-REFERENCE TO RELATED APPLICATION

The present application claims the benefit of U.S. Provisional Patent Application No. 62/053,325 filed Sep. 22, 2014, which is incorporated herein by reference in its entirety.

FIELD

The present subject matter relates to coatings for application to paper. The coatings facilitate printing of the paper and promote anchorage and retention of various print media such as inks.

BACKGROUND

Generally, printing of UV curable inks on paper is limited by the speed at which a UV-based polymerization reaction in the ink occurs. That reaction establishes solidification of the ink and promotes bonding between the ink and the paper surface. As coated papers are also known, the bonding of the ink may be with regard to an outer surface of a coated paper. The extent of bonding between the ink and the paper surface or other layer is typically improved by allowing for longer reaction and/or curing times. However, longer time periods reduce process throughput and thus increase costs.

In addition to, or instead of curing of UV curable inks, other radical polymerizing processes can occur along a face of paper or coated paper. For example, curing of UV curable adhesives can occur in lamination or over-lamination processes, or in cold foil stamping. Another example involves electron beam (EB) curing of EB curable inks.

Although UV curable coating compositions are known which promote printability, these compositions contain residual monomers, oligomers, and/or photoinitiators. Residual monomers, oligomers, and/or photoinitiators may be detrimental to the environment, hinder recyclability, and/or potentially present health issues if used in association with packaging for food, consumables, or health care products.

Accordingly, a need exists for a strategy to improve the extent of bonding of UV curable compositions with paper while increasing processing speeds and avoiding the noted potential environmental and health issues.

SUMMARY

The difficulties and drawbacks associated with previous approaches are addressed in the present subject matter as follows.

In one aspect, the present subject matter provides a coating composition for application to paper. The coating composition comprises at least one agent and a coating matrix. The at least one agent (i) includes at least one reactive ethylenically unsaturated group, and (ii) is radically polymerizable. The at least one agent is in the coating matrix. The coating composition is free or substantially free of residual monomers, residual oligomers, residual photoinitiators, and combinations thereof.

In another aspect, the coating composition comprises coated paper comprising a paper substrate, and a coating composition disposed on a face of the paper substrate. The coating composition has (a) at least one agent that (i) includes at least one reactive ethylenically unsaturated group, and (ii) is radically polymerizable, and (b) a coating matrix. The at least one agent is in the coating matrix. The coating composition is free or substantially free of residual monomers, residual oligomers, residual photoinitiators, and combinations thereof.

In yet another aspect, the present subject matter provides a method of forming a coated paper. The method comprises providing a paper substrate defining at least one face. The method also comprises providing a coating composition having (a) at least one agent that (i) includes at least one reactive ethylenically unsaturated group, and (ii) is radically polymerizable, and (b) a coating matrix. The method additionally comprises depositing the coating composition on the face of the paper to thereby form the coated paper. The coating composition is free or substantially free of residual monomers, residual oligomers, residual photoinitiators, and combinations thereof.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter provides coatings for application to a wide array of substrates and particularly to paper. The coatings promote printing and/or retention of UV curable compositions such as inks, colorants, and pigment-containing formulations onto the coated substrates. Use of the coatings in many print applications enables faster printing and/or processing rates. As described herein, in many embodiments, the coatings are free or substantially free of residual monomers, residual oligomers, residual photoinitiators, and combinations thereof. Such coatings can be used in a variety of applications such as environmentally-friendly packaging and food and consumer health care containers or packaging.

The coatings of the present subject matter comprise agents that can be covalently bonded in a radical polymeric chain reaction such as occurs during curing of a UV curable composition for example a UV curable ink after printing on a coated substrate. A wide array of radically polymerizable agents can be used so long as the agent (i) includes at least one reactive ethylenically unsaturated group, and (ii) is radically polymerizable. Nonlimiting examples of agents having reactive ethylenically unsaturated groups include vinyl monomers, acrylic monomers, and styrene monomers. The present subject matter includes other agents and is not limited to vinyl monomers, acrylic monomers, and/or styrene monomers. Additional details are provided herein.

The coatings also comprise a matrix which is initially in a liquid or flowable state. The previously noted agents are incorporated in the coatings and typically mixed or otherwise dispersed throughout the matrix. Various formulations can be used for the matrix. The matrix may also comprise one or more solvents and/or other components. Additional details are provided herein.

In many embodiments of the present subject matter, the coatings are free or substantially free of residual monomers, oligomers, and/or photoinitiators. The term "residual" as used herein refers to agent(s) in the coating composition that are unreacted or which are free for subsequent reaction after formation of the coating. The term "substantially free" refers to total concentrations of the noted agent(s) which are less than 1%, in certain embodiments less than 0.1%, and in particular embodiments less than 0.01% (all percentages expressed herein are percentages by weight unless noted otherwise).

The coatings are particularly well suited for application to paper and similar substrates. After application to paper and drying of the coating, the coated paper can receive print or other UV curable formulations. After deposition or application of the UV curable formulation on the coated paper, the product is subjected to one or more UV curing operations which result in curing of the UV curable formulation, e.g., ink, and covalent bonding of the agent(s) in the coating to the UV curable formulation. The coating may also be further bonded or affixed to the paper during the UV curing operation(s). This serves to anchor the UV curable formulation with the substrate, e.g., paper. Additional details of these and other aspects are provided herein.

Agents for the Coating Composition

As previously noted, the one or more agents in the coating composition include at least one reactive ethylenically unsaturated group, and are radically polymerizable.

Agents of this type suitable for use in accordance with the present subject matter include nearly any compounds having vinyl functionality, i.e., ethylenic unsaturation, such as vinyl monomers. In many embodiments, the vinyl monomers are selected from the group consisting of vinyl esters, vinyl aromatic hydrocarbons, vinyl aliphatic hydrocarbons, vinyl alkyl ethers and mixtures thereof.

Suitable vinyl monomers include vinyl esters, such as, for example, vinyl propionate, vinyl laurate, vinyl pivalate, vinyl nonanoate, vinyl decanoate, vinyl neodecanoate, vinyl butyrates, vinyl benzoates, vinyl acetates, vinyl isopropyl acetates and similar vinyl esters; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinyl chloride and vinylidene chloride as well as alpha olefins such as, for example, ethylene, propylene, isobutylene, as well as conjugated dienes such as 1,3-butadiene, methyl-2-butadiene, 1,3-piperylene, 2,3-dimethyl butadiene, isoprene, cyclohexene, cyclopentadiene, and dicyclopentadiene; and vinyl alkyl ethers, such as, for example, methyl vinyl ether, isopropyl vinyl ether, n-butyl vinyl ether, and isobutyl vinyl ether.

Examples of vinyl compounds typically comprising an $\alpha,\beta$-ethylenically unsaturated vinyl monomer which contains from 2 to 12 carbon atoms include esters of acrylic and methacrylic acid, such as methyl methacrylate, ethyl acrylate, ethyl methacrylate, 2-ethylhexyl acrylate, butyl acrylate, butyl methacrylate, 2-hydroxyethyl acrylate, 2-hydroxybutyl methacrylate and the like; vinyl esters, such as vinyl acetate, vinyl butyrate, vinyl caprolate and the like; nitrile monomers, such acrylonitrile, methacrylonitrile and the like; vinyl chloride; vinylidene chloride; and the like. In another embodiment, the $C_3$-$C_{12}$ $\alpha,\beta$-ethylenically unsaturated vinyl monomer is butyl acrylate, ethyl acrylate, ethyl methacrylate, methyl methacrylate, vinyl acetate, acrylonitrile, or a mixture thereof. In another embodiment, the $C_3$-$C_{12}$ $\alpha,\beta$-ethylenically unsaturated vinyl monomer is butyl acrylate, ethyl methacrylate, methyl methacrylate, vinyl acetate, or a mixture thereof. In another embodiment, the $C_3$-$C_{12}$ $\alpha,\beta$-ethylenically unsaturated vinyl monomer is butyl acrylate, ethyl methacrylate, vinyl acetate, or a mixture thereof. One or more urethane acrylates may also be used.

Styrenic monomers, such as those previously noted in association with examples of vinyl aromatic hydrocarbons can be used. Additional examples of styrene monomers include t-butylstyrene, isopropylstyrene, p-chlorostyrene and the like can also be used.

A particular example of an agent for use in the coating compositions is PM-1, an acrylated acrylic polymer, prepared as described herein.

The one or more agent(s) are combined with the coating matrix at nearly any agent concentration. Typically, the total concentration of agent(s) in the coating matrix is within a range of from 0.1% to about 50%. However, the present subject matter includes the use of one or more agent(s) at a total concentration of less than 0.1% and/or greater than 50%.

Coating Matrixes for the Coating Composition

The coating matrix is at least initially in a liquid or flowable form. The coating matrix is combined with the agent(s) to thereby form the coatings of the present subject matter.

The coating matrix can be in the form of one or more (i) urethane coatings and/or (ii) latex/chalk coatings. The present subject matter includes the use of a combination of a urethane coating and a latex/chalk coating.

A. Urethane Coatings

An example of a urethane coating composition for applying to paper substrates in accordance with the present subject matter is a urethane-based topcoat that includes one or more agent(s) as previously noted. In certain embodiments, the coating composition is an aqueous dispersion comprising at least: (1) a polyurethane, and (2) a polyurethane acrylate. In particular, suitable topcoating materials are composed of: (1) an aliphatic polyurethane, and (2) an aliphatic polyurethane acrylate. In certain versions of the present subject matter the following formulations are particularly advantageous—namely, an aqueous dispersion comprising at least: (1) a waterborne aliphatic polyether polyurethane, and (2) a waterborne aliphatic urethane acrylate.

Suitable polyurethanes for application in accordance with the present subject matter are selected from waterborne polyester-polyurethanes and waterborne polyether-polyurethanes. A polyester-polyurethane polymer is the reaction product of a predominantly aliphatic polyisocyanate component and a polyester polyol component. As used herein, the term "predominantly aliphatic" means that at least 70 weight percent of the polyisocyanate component is an aliphatic polyisocyanate, in which all of the isocyanate groups are directly bonded to aliphatic or cycloaliphatic groups, regardless of whether aromatic groups are also present. In particular embodiments, the amount of aliphatic polyisocyanate is at least 85 weight %, and more particularly, 100 weight %, of the polyisocyanate component. Examples of suitable aliphatic polyisocyanates include ethylene diisocyanate, 1,6-hexamethylene diisocyanate, isophorone diisocyanate, cyclohexane-1,4-diisocyanate, 4,4-dicyclohexylmethane diisocyanate, cyclopentylene diisocyanate, p-tetramethylxylene diisocyanate (p-TMXDI) and its meta isomer (m-TMXDI), hydrogenated 2,4-toluene diisocyanate, and 1-isocyanto-1-methyl-3(4)-isocyanatomethyl cyclohexane (IMCI). Mixtures of aliphatic polyisocyanates can also be used.

Polyester polyols that may be used in the polyester polyol component include hydroxyl-terminated reaction products of polyhydric alcohols such as ethylene glycol, propylene glycol, diethylene glycol, neopentyl glycol, 1,4-butanediol, 1,6-hexanediol, furan dimethanol, cyclohexane dimethanol, glycerol, trimethylolpropane or pentaerythritol, or mixtures thereof. Also included are polycarboxylic acids, especially dicarboxylic acids, and ester-forming derivatives thereof. Examples include succinic, glutaric and adipic acids or their methyl esters, phthalic anhydride and dimethyl terephthalate. Polyesters obtained by the polymerization of lactones, for example caprolactone, in conjunction with a polyol may also be used. Commercially available polyester-polyurethanes useful in accordance with the present subject matter include those sold under the trade names AVALURE UR-425, AVALURE UR-430, AVALURE UR-405 and AVALURE UR-410 by Goodrich Corporation (Charlotte, N.C.), NEOREZ R600, NEOREZ R9679 and NEOREZ R-989 all by NeoResins (Waalwijk, The Netherlands).

A polyether-polyurethane polymer is the reaction product of a predominantly aliphatic polyisocyanate component and a polyether polyol component. Useful aliphatic polyisocyanates are described above. Suitable polyether polyols include products obtained by the polymerization of a cyclic oxide or by the addition of one or more such oxides to polyfunctional initiators. Such polymerized cyclic oxides include, for example, ethylene oxide, propylene oxide and tetrahydrofuran. Such polyfunctional initiators having oxides added include, for example, water, ethylene glycol, propylene glycol, diethylene glycol, cyclohexane dimethanol, glycerol, trimethylopropane, pentaerythritol and Bisphenols (such as A and F).

Suitable polyesters include polyoxypropylene diols and triols, poly (oxyethylene-oxypropylene) diols and triols obtained by the simultaneous or sequential addition of ethylene and propylene oxides to appropriate initiators and polytetramethylene ether glycols obtained by the polymerisation of tetrahydrofuran. Commercially available polyether-polyurethanes useful in accordance with the present subject matter include those sold under the trade names SANCURE 878, AVALURE UR-450 and SANCURE 861 by Goodrich Corporation (Charlotte, N.C.), NEOREZ 8563 and NEOREZ R-551 by NeoResins (Waalwijk, The Netherlands).

In accordance with aspects of the present subject matter, urethane acrylates can be used. The functionality (amount of acrylic moieties per molecule) for urethane acrylates varies in practice between one and six. Generally, the lower the functionality, the lower the reactivity, the better the flexibility and the lower the viscosity. The topcoat compositions in accordance with the present subject matter typically have a functionality of two or three.

Monofunctional urethane acrylates are a specialty product, which are used to improve adhesion to difficult substrates and to improve flexibility. These products are very low in viscosity. High functionality urethane acrylates (functionality 4 or higher) are also specialty products that are used to improve reactivity, scratch resistance, chemical resistance, etc.

Four types of isocyanates can be used for urethane acrylate synthesis: monoisocyanates, aliphatic diisocyanates, aromatic diisocyanates and polymeric isocyanates. Isocyanates that are not monoisocyanates are also called polyisocyanates. Monoisocyanates are used for monofunctional urethane acrylates only, and this type of oligomer is described above. Diisocyanates are by far the most widely used in urethane acrylate synthesis. They are available in aliphatic and aromatic diisocynates. Aromatic diisocyanates are used for the manufacture of the so-called aromatic urethane acrylates. The incorporation of an aromatic diisocyanate renders the urethane acrylate harder and gives it a better scratch resistance. Aromatic urethane acrylates are also significantly lower cost than aliphatic urethane acrylate. This makes them interesting for those applications, where the performance of a urethane acrylate is desired (e.g. a good flexibility or abrasion resistance) but the formulation has to be relatively low cost. One drawback of aromatic urethane acrylates is that they tend to yellow and therefore they are less appropriate for long lasting applications on white or light colored substrates.

Aliphatic diisocyanates are used in aliphatic urethane acrylates. Aliphatic urethane acrylates are slightly more flexible than aromatic urethane acrylates with the same functionality, a similar polyol modifier and at similar molecular weight. One advantage of aliphatic urethane acrylates is that they are virtually non-yellowing and therefore can be used for long lasting applications, on white or light colored substrates.

Polymeric isocyanates are used less for urethane acrylates than diisocyanates. They are essentially used for higher functionality (e.g., 3 and higher) urethane acrylates. Isocyanate-functional reactants are made from polyisocyanates reacted with a compound containing active hydrogen functionality with hydroxyl groups being typical, although mercaptan groups, amine groups, and carboxyl groups also can be used.

Polyisocyanates are conventional in nature and include, for example, hexamethylene diisocyanate, toluene diisocyanate (TDI), diphenylmethane diisocyanate (MDI), m- and p-phenylene diisocyanates, bitolylene diisocyanate, cyclohexane diisocyanate (CHDI), bis-(isocyanatomethyl) cyclohexane (H 6 XDI), dicyclohexylmethane diisocyanate (H 12 MDI), dimer acid diisocyanate (DDI), trimethyl hexamethylene diisocyanate, lysine diisocyanate and its methyl ester, isophorone diisocyanate, methyl cyclohexane diisocyanate, 1,5-napthalene diisocyanate, xylylene and xylene diisocyanate and methyl derivatives thereof, polymethylene polyphenyl isocyanates, chlorophenylene-2,4-diisocyanate, polyphenylene diisocyanates available commercially as, for example, Mondur MR or Mondur MRS, isophorone diisocyanate (IPDI), hydrogenated methylene diphenyl isocyanate (HMDI), tetramethyl xylene diisocyanate (TMXDI), hexamethylene diisocyanate (HDI), or oligomer materials of these materials such as a trimer of IPDI, HDI or a biuret of HDI, and the like and mixtures thereof.

In many embodiments in accordance with the present subject matter, the coating composition comprises aliphatic urethane acrylates that have a polyester or a polyether backbone.

Polyether urethane acrylates are typically more flexible than polyester urethane acrylates and often lower cost. In addition, a polyether urethane acrylate will have a slightly lower viscosity that a polyester urethane acrylate with the same functionality and approximately the same molecular weight.

Polyesters can be synthesized, for example, by reacting $C_1$-$C_{12}$ diacids (or their corresponding anhydrides) or other diacids with a diol or a mixture of diols. The mixture is heated in the presence of a catalyst to temperatures sufficient to remove the water formed in the condensation reaction.

Polyethers can be synthesized from ethylene oxide to have a molecular weight of, for example, about 1,000-6000 (Mn) by conventional techniques well known in the art. Polyether polyols (e.g., block polyethylene and polypropylene oxide homo- and co-polymers) optionally alkylated (e.g., polytetramethylene ether glycols) also can be used. Additionally, ethylene oxide and propylene oxide can be co-reacted to form the polyether polyol, or the polyether polyol can be but on a di-functional compound that contains groups reactive with ethylene oxide and propylene oxide. Such suitable groups include, for example, hydroxyl groups, thiol groups, acid groups, and amine groups. Accordingly, diols, triols, dithiols, diacids, diamines, and the like, are suitable di-functional compounds which can be reacted with ethylene oxide and/or propylene oxide for synthesizing the polyether in accordance with the present subject matter. Suitable such compounds include, for example, alkylene glycols, typically ranging from about 2 to 8 carbon atoms (including cycloalkylene glycols). Illustrative of such diols are ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methyl pentane, 1,5-diol, 1,4-cyclohexanedimethanol, and the like, and mixtures thereof. Diethylene glycol, dipropylene glycol, and the like additionally can be used as desirable or convenient.

A hydroxy (meth)acrylate monomer can be included to functionalize the polyester-polyether urethane for later UV curing. Suitable hydroxy (meth)acrylates include, for example, hydroxyethyl (meth)acrylate, hydroxypropyl (meth)acrylate, hydroxybutyl (meth)acrylate, caprolactone acrylate and the like. Alternatively, other hydroxy functional monomers may be employed, for example, hydroxybutyl vinyl ether or allyl alcohol. In keeping with terminology in this field, the parenthetical group is optional. Thus, "(alkyl) acrylate" means "acrylate and alkylacrylate".

Typical commercially available examples of urethane acrylates that can be used in accordance with the present subject matter are UCECOAT 7772, UCECOAT 7773, UCECOAT 7849, UCECOAT 7770 (all from CYTEC Surface Specialties), Joncryl U6336 (BASF), BAYHYDROL UV 2317, BAYHYDROL UV VP LS 2348 (Bayer).

The coating composition in accordance with the present subject matter may include one or more water dispersible crosslinkers. Suitable water dispersible polyfunctional chemically activatable crosslinking agents are commercially available. These crosslinking agents include dispersible formulations of polyfunctional aziridines, isocyanates, melamine resins, epoxies, oxazolines, carbodiimides and other polyfunctional crosslinkers. In one embodiment, the crosslinking agents are added at an amount in a range of from about 0.1 parts to about 30 parts based on 100 parts total solids. In one other embodiment, the crosslinking agents are added at an amount in a range of from about 1 part to about 20 parts based on 100 parts total solids. In another embodiment, the crosslinking agents are added at an amount in a range of from about 2 parts to about 15 parts based on 100 parts total solids. In still a further embodiment, the crosslinking agents are added at an amount greater than or equal to about 4 parts based on 100 parts total solids, and in yet a further embodiment, the crosslinking agents are added at an amount in a range of from about 4 parts to about 7 parts based on 100 parts total solids. Adding crosslinking agents to the polyurethane dispersion composition may form an interpenetrating or interconnected network having crosslinked matrixes which link the blended polymers with covalent and/or non-covalent linkages.

Other additives can be added as well to obtain a certain desired characteristic, such as waxes, defoamers, surfactants, colorants, anti-oxidants, UV stabilizers, luminescents, cross-linkers, etc.

In one embodiment, the coating composition contains anti-blocking additives. These additives reduce the tendency of the coating or layer to stick together when it is in roll form or in a collection of stacked sheets. The anti-blocking additives include natural silica, diatomaceous earth, synthetic silica, glass spheres, ceramic particles, etc. Slip additives including primary amides such as stearamide, behenamide, oleamide, erucamide, and the like; secondary amides such as stearyl erucamide, erucyl erucamide, oleyl palimitamide, stearyl stearamide, erucyl stearamide, and the like; ethylene bisamides such as N, NN-ethylenebisstearamide, N, NN-ethylenebisolamide and the like; and combinations of any two or more of the foregoing amides can also be included.

An example of a urethane-based coating composition which can be used in the present subject matter are the compositions disclosed in WO2010091346.

Another example of a urethane-based coating composition which can be used in the present subject matter and which is commercially available is UCECOAT 7849 which is commercially available from Allnex. UCECOAT 7849 is an aliphatic acrylated polyurethane dispersion, which is anionic stabilized.

B. Latex/Chalk Coatings

As previously noted, the matrix component of the present subject matter coating compositions can be in the form of latex/chalk coatings. One or more of the previously noted agent(s) are combined with the latex/chalk coating.

An example of a latex/chalk coating composition for applying to paper substrates in accordance with the present subject matter is an aqueous composition including at least one pigment, at least one binder, and optionally one or more additives. Nonlimiting examples of pigments include calcium carbonate, kaolin, titanium dioxide, blancfixe, and satin white as known in the art. Nonlimiting examples of binders may include synthetic fixatives or latex systems. Nonlimiting examples of additives include white pigments, optical brighteners, defoaming agents, and biocides. Various latex/chalk coatings are known in the art such as for example those described in Applications of Synthetic Resin Latices, Volume 3, Latices in Diverse Applications, H. Warson and C. A. Finch, John Wiley & Sons, 8 okt. 2001 (pp. 1253 and associated pages).

The coating compositions in accordance with the present subject matter may be applied to the paper substrates by methods well known in the art. Non-limiting examples of these application methods are Meyer-rod coating, direct gravure coating, the coating, reverse gravure coating. Dixon coating reverse gravure, roll coating, spray coating, knife coating, and the like.

The coating composition is deposited or otherwise applied to a paper substrate at a coat weight typically within a range of from about 0.2 gsm (g/m$^2$) to about 30 gsm, more particularly from 0.5 gsm to 20 gsm, more particularly from 1.0 gsm to 10 gsm, and in certain embodiments from 1.0 gsm to 2.0 gsm. However, it will be appreciated that the present subject matter includes the use of coat weights less than 0.2 gsm and/or greater than 30 gsm. These various coat weights are all with respect to the coating composition after drying.

UV Curable Formulations

In one embodiment, the UV curable formulation is a UV curable ink. The ultraviolet (UV) radiation curable inks useful in the present subject matter generally comprise a binder which comprises one or more photopolymerizable monomers. The photopolymerizable monomers generally are ethylenically unsaturated compounds. The unsaturated compounds may contain one or more olefinic double bonds, and they may be low molecular weight compounds, (monomeric) or high molecular weight compounds (oligomeric). Representative nonlimiting examples of monomers containing one double bond are acrylates such as alkyl(meth)acrylates or hydroxyalkyl(meth)acrylates such as methyl-, ethyl-, butyl-, 2-ethylhexyl- or 2-hydroxyethylacrylate, isobornylacrylate, methyl- or ethylmethacrylate. Further examples of photopolymerizable monomers are acrylonitrile, acrylamide, methacrylamide, N-substituted (meth) acrylamides, vinyl esters such as vinyl acetate, vinyl ethers such as isobutylvinyl ether, styrene, alkylstyrenes and halostyrenes, N-vinylpyrrolidone, vinyl chloride or vinylidene chloride.

Monomers containing a plurality of double bonds are typically the diacrylates of ethylene glycol, 1,3-propylene glycol, 1,4-butaneodiol, 1,4-cyclohexane diol, neopentyl glycol, hexamethylene glycol, or bisphenol A polyacrylates such as trimethylolpropane triacrylate and pentaerythritol triacrylate or tetraacrylate, vinyl acrylate, divinyl benzene, divinyl succinate, diallyl phthalate, triallylphosphate, triallylisocyanurate or tris(2-acryloyloxy)ethyl-isocyanurate.

Typical examples of high molecular weight (oligomeric) polyunsaturated compounds are acrylated epoxy resins, acrylated polyethers, acrylated polyurethanes or acrylated polyesters. Further examples of unsaturated oligomers are unsaturated polyester resins which are normally prepared from maleic acid, phthalic acid and one or more diols and which have molecular weights of about 500 to about 3000. Such unsaturated oligomers may also be referred to as prepolymers. Single component systems based on photocurable prepolymers are often used as binders for printing inks. Unsaturated polyester resins are normally used in two component systems together with a monounsaturated monomer such as described above, and in many applications with styrene.

The unsaturated compounds also can be used in admixture with non-photopolymerisable film-forming components. These components may typically be drying polymers or their solutions in organic solvents, such as nitrocellulose. They may also, however, be chemically curable or thermocurable resins such as poly isocyanates, polyepoxides or melamine resins. Concurrent use of thermocurable resins may be useful in so-called hybrid systems which are photopolymerised in a first step and crosslinked by a thermal after treatment in a second step.

The UV radiation curable inks also typically contain at least one photoinitiator. A wide range of different photoinitiators can be used for UV radiation curable systems. The photoinitiators include benzophenone and benzophenone derivatives, benzoin ethers, benzil ketals, dialkoxyacetophenones, hydroxyacetophenones, aminoacetophenones, haloacetophenones or acryloxyphosphine oxides. The photoinitiators differ in that they have different absorption maxima. To cover a wide absorption range it is possible to use a mixture of two or more photoinitiators. The total amount of photoinitiator in the UV radiation curable compositions may be in the range of from about 0.05% to about 7%, or 10% by weight of the total composition. In many applications, the compositions contain from about 0.2% to about 5% by weight of the photo initiator.

Amines may be added to accelerate the photopolymerisation, for example triethanolamine, N-methyl-diethanolamine, p-dimethylaminobenzoate or Michler's ketone. The photopolymerisation can further be accelerated by the addition of photosensitisers which displace or broaden the spectral sensitivity. These photosensitisers are preferably aromatic carbonyl compounds such as thioxanthone, anthraquinone and 3-acyl-coumarin derivatives as well as 3-(aroyl-methylene)-thiazolines.

Hindered amine light stabilizers (HALS) which function as co-stabilizers, also may be added to the UV radiation curable printing compositions used in the present subject matter. Examples of hindered amine light stabilizers include those listed and recited in U.S. Pat. Nos. 5,112,890 and 4,636,408. A specific example of a hindered amine light stabilizer useful in the printing inks is TINUVIN 292 which is identified as bis(1,2,2,6,6-pentamethyl-4-piperidinyl) sebacate.

In addition to the above described binder materials and photoinitiators, the UV radiation curable inks used in the present subject matter may also contain coloring matter selected from organic pigments, inorganic pigments, body pigments and dyes which are known and have been used in this art. Examples of useful pigments include titanium dioxide, cadmium yellow, cadmium red, cadmium maroon, black iron oxide, carbon black, chrome green, gold, silver, aluminum and copper. Examples of dyes include alizarine red, Prussian blue, auramin naphthol, malachite green, etc. Generally the concentration of the pigment or dye in the ink will be from about 0 to about 70% by weight, and in one embodiment, from about 0.1% to about 50% by weight.

In addition to the above described coloring matter, the UV radiation curable inks used in the present subject matter may also contain fillers, extenders, surfactants, and the like which are known and have been used in this art. Examples of useful fillers and extenders include silicon dioxide, fumed silica, glass or ceramic microspheres, and glass or ceramic bubbles. Generally the concentration of the filler or extender will be from about 0 to about 70% by weight, and in one embodiment, from about 0.5% to about 50% by weight.

Paper and Other Substrates

The coated papers of the present subject matter include, as one or more layer(s), a substrate sheet of paper. Paper substrates are particularly useful because of the wide variety of applications in which they can be employed. Any type of paper having sufficient tensile strength to be handled in conventional paper coating and treating apparatus can be employed as the substrate layer. The paper used depends upon the end use and particular personal preferences. Included among the types of paper which can be used are paper, clay coated paper, glassine, polymer coated paper, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight can be employed as a substrate material, paper having weights in the range of from about 20 to about 150 pounds per ream are useful, and papers having weights in the range of from about 30 to about 60 pounds per ream are presently preferred. The term "ream" as used herein equals 3000 square feet. Examples of specific papers which can be utilized as substrates in preparing the coated papers of the present subject matter include 41-pound offset grade bleached Kraft; 50-pound bleached Kraft paper, etc.

Figure 1:
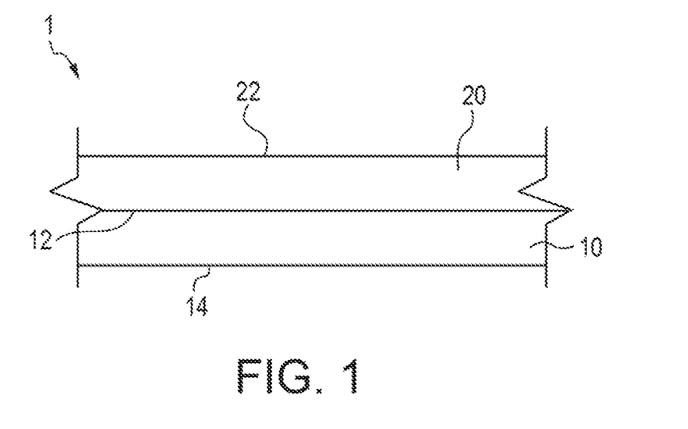
FIG. 1 is a schematic cross sectional view of a coated substrate in accordance with an embodiment of the present subject matter.

FIG. 1 is a schematic cross sectional view of a coated substrate 1 in accordance with an embodiment of the present subject matter. The coated substrate 1 comprises a substrate 10 such as paper that defines two oppositely directed faces 12 and 14. The coated substrate 1 also comprises a layer 20 or a region, of a coating composition as described herein. The layer 20 is disposed on at least one of the faces 12 and 14. The layer 20 defines an exposed face 22.

Figure 2:
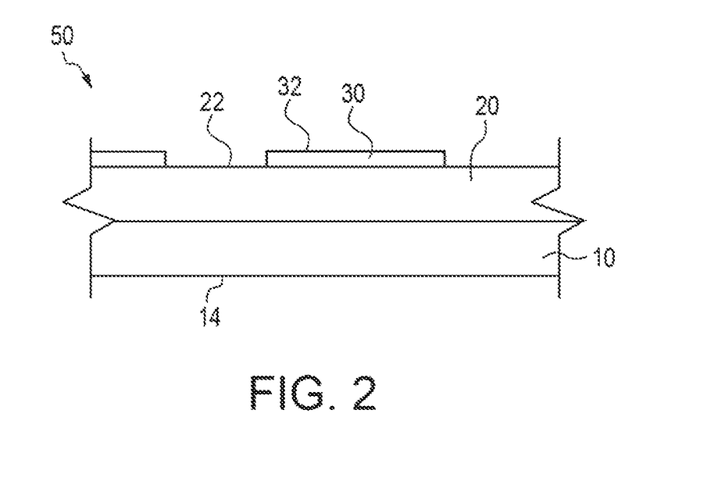
FIG. 2 is a schematic cross sectional view of the coated substrate of FIG. 1 after deposition of a UV curable composition in accordance with another embodiment of the present subject matter.

FIG. 2 is a schematic cross sectional view of the coated substrate 1 after deposition of a UV curable composition to thereby form a printed and coated substrate 50 such as printed and coated paper for example. The printed and coated paper 50 comprises the coated substrate 1 as shown in FIG. 1 having one or more layers or regions 30 of a UV curable material such as a UV curable ink, deposited on the layer 20 of coating material. The outer face of the UV curable material 30 defines an exposed face 32. The present subject matter includes the use of one or more materials and/or additional layers disposed on faces 14, 22, and/or 32.

Figure 3:
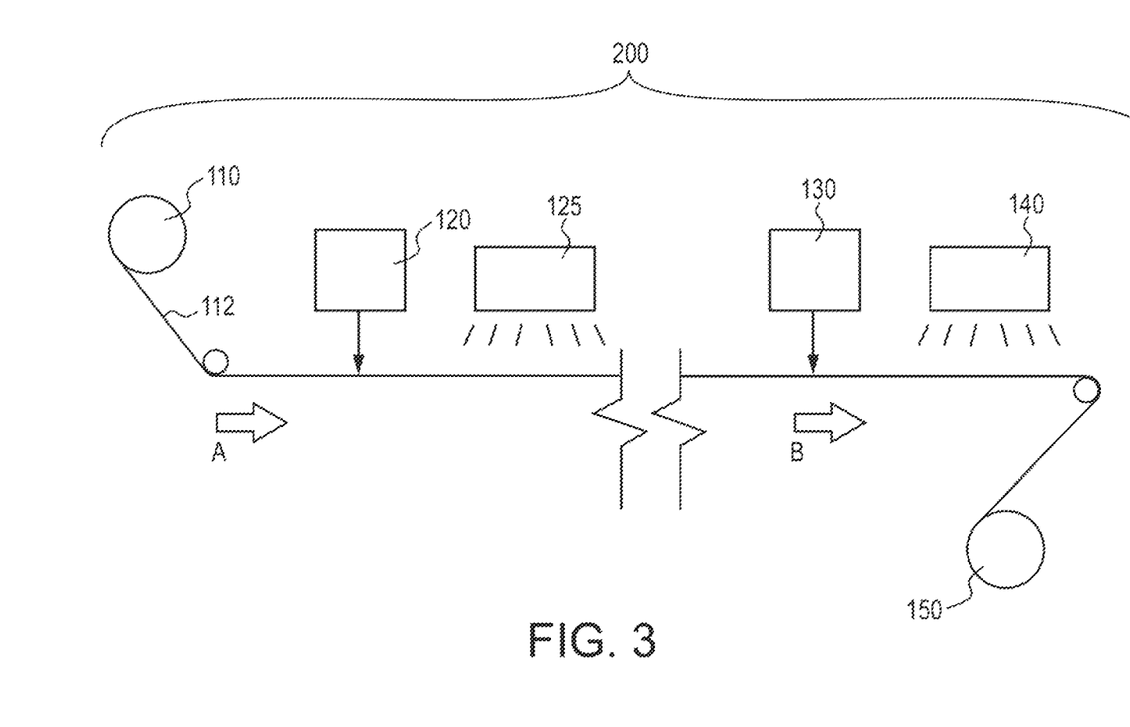
FIG. 3 is a schematic diagram illustrating a system and process in accordance with additional embodiments of the present subject matter.

FIG. 3 is a schematic diagram illustrating a system and process 200 for forming a coated substrate and a printed and coated substrate in accordance with the present subject matter. The system and process comprises a source of substrate 110 typically in a roll form. Although roll form is noted, it will be appreciated that the present subject matter includes other forms and configurations of substrates. The substrate having a face 112 for receiving a coating, is directed from the source 110 toward a coating composition applicator 120, i.e., in the direction of arrow A. The applicator 120 selectively applies a coating composition as described herein onto the face 112 of the substrate. The coated substrate is then optionally directed to a drying station 125 at which heat and/or air is directed at the coating to dry or at least partially dry the coating disposed on the substrate. The present subject matter also includes systems and processes that do not use external heat or airstreams to promote drying. Instead, drying may be accomplished by exposure to ambient air.

After at least partially drying the coating, the coated substrate is directed to a UV curable composition applicator 130, i.e., in the direction of arrow B. The applicator 130 selectively applies, for example by printing, a UV curable composition on the coated substrate. The resulting intermediate product is then directed to a UV cure station 140 at which UV radiation is directed to the UV curable composition previously deposited on the coated substrate. After full or at least partial curing, the cured product may optionally be collected in the form of a roll 150. However, it will be appreciated that the present subject matter includes other forms and configurations for the printed product.

EXAMPLES

Example 1

In order to evaluate a coated paper prepared according to the present subject matter, a coating composition was prepared and applied to a paper at different coat weights. After drying, a UV curable ink was printed on the coated paper and ink anchorage was assessed.

The paper used was UPM Labelcoat 80.

The coating composition used was prepared by combining 0.24 gsm (dry) of NEOREZ R600, 0.16 gsm (dry) of urethane acrylate NEORAD R444, and 0.024 gsm (dry) of CX100, all available from DSM NeoResins of the Netherlands. The materials were dispersed in water to a concentration suitable for a gravure roller of a coater to provide the desired coatweight.

Samples of coated paper were prepared using coat weights of 0.4 gsm, 0.8 gsm, 1.5 gsm, and 2.0 gsm. The coating composition was applied by Dixon coating reverse gravure, 13 cc/m$^2$ wet, and drying to a web temperature of 50° C. (ambient air temperature 75° C.).

A UV curable ink was printed on the coated paper samples using a FLEXIPROOF 100UV machine at speeds of 80 m/minute. A banded anilox was used with six cell volumes (3, 4, 5, 6, 8, and 13 cc/m$^2$).

Five seconds after printing, a tape test was performed using Scotch 810 tape. The adhesive face of the tape was contacted with the printed and coated paper samples. Evaluation of the extent of ink anchorage was then made after removal of the tape. A sample which did not transfer ink to the tape received a score of 100% and represents ideal ink anchorage. A sample which transferred all ink to the tape received a score of 0% and represents no ink anchorage. The evaluations were performed by measuring optical density of the samples and averaging to obtain a representative percentage score.

Table 1 summarizes the results of this evaluation.

TABLE 1

| Ink Anchorage | | |
|---|---|---|
| Sample | Coat Weight | Ink Anchorage |
| A | 0 gsm | 45% |
| B | 0.4 gsm | 72% |
| C | 0.8 gsm | 78% |
| D | 1.2 gsm | 87% |
| E | 2.0 gsm | 100% |

The results summarized in Table 1 demonstrate that use of a coating composition on paper in accordance with the present subject matter significantly improves ink anchorage.

Example 2

In this evaluation, paper samples coated with coating compositions including an acrylated polyurethane dispersion dispersed in a latex/chalk matrix at various weight proportions were prepared.

The coating compositions were prepared by combining the acrylated polyurethane dispersion commercially available from Allnex under the designation UCECOAT 7849 with a latex/chalk coating composition as described in Table 2. The polyurethane dispersion was used at various weight proportions ranging from 0 to 40%.

TABLE 2

| Coating Composition Used in Example 2 | |
|---|---|
| Component | Parts by Weight |
| HYDROGLOSS 90, kaolin clay | 60.0 |
| OMYACARB 60, calcium carbonate | 40.0 |
| DISPEX N40, polyacrylic acid sodium salt | 0.2 |
| NOPCO C104, calcium stearate | 1.0 |
| DOW RHOPLEX P-376, styrene-acrylate latex | 16.0 |

The coating compositions were then applied to the paper and dried as described in Example 1. Printing of a UV curable ink was then performed also as previously described in Example 1.

Ink anchorage using adhesive tape was then assessed as previously described in Example 1.

Table 3 set forth below summarizes the results of the ink anchorage evaluations of Example 2.

TABLE 3

Ink Anchorage

| Sample | Weight Percent of UCECOAT 7849 in Coating | Ink Anchorage |
|---|---|---|
| F | 0% | 44% |
| G | 4% | 55% |
| H | 10% | 89% |
| I | 20% | 98% |
| J | 30% | 95% |
| K | 40% | 94% |

These results presented in Table 3 demonstrate the existence of a strong correlation between the amount of the agent in the coating composition and ink anchorage.

Example 3

In this evaluation, paper samples received coating compositions including an acrylated acrylic polymer referred to herein as PM-1. The PM-1 agent was dispersed at different weight proportions in the latex/chalk matrix described in Example 2.

The PM-1 agent was prepared by forming an initial acrylic emulsion of methyl methacrylate (MMA), butyl acrylate (BA), and methacrylic acid (MAA) at a molar ratio of 50/46/4, respectively. The resulting latex was then post-reacted with glycidyl methacrylate (GMA) to introduce pendant methacrylate groups via the reaction between MAA carboxylic acid groups and the GMA epoxy group. The MAA:GMA stoichiometry was 1:0.65, respectively.

Various coating compositions were then prepared by combining the PM-1 polymer agents with the previously noted latex-chalk coating described in Example 2. The PM-1 polymer agent was incorporated in the coating composition and then the resulting formulation coated on paper using a wirebar (WB 24 cc/m$^2$, dry coat weight of 9 gsm), and then dried at 90° C. for 2 minutes.

Ink anchorage was evaluated with tape as previously described in Example 1.

Table 4 set forth below summarizes the results of the ink anchorage evaluations of Example 3.

TABLE 4

Ink Anchorage

| Sample | Weight Percent of PM-1 | Ink Anchorage |
|---|---|---|
| L | 0% | 44% |
| M | 1% | 48% |
| N | 2.5% | 65% |
| O | 5% | 96% |
| P | 7.5% | 93% |
| Q | 9% | 93% |
| R | 10% | 99% |
| S | 20% | 100% |

The results summarized in Table 4 demonstrate that excellent ink anchorage is obtained at relative low levels of the PM-1 agent incorporated in a coating composition.

Many other benefits will no doubt become apparent from future application and development of this technology.

All patents, applications, standards, books, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A coating composition for application to paper, the coating composition comprising:
   a coating matrix;
   at least one agent in the coating matrix that (i) includes at least one reactive ethylenically unsaturated group, and (ii) is radically polymerizable;
   wherein the coating composition is free or substantially free of residual monomers, residual oligomers, residual photoinitiators, and combinations thereof.

2. The coating composition of claim 1 wherein the coating matrix also includes at least one solvent.

3. The coating composition of claim 1 wherein the agent includes a vinyl monomer.

4. The coating composition of claim 1 wherein the coating matrix includes at least one of a urethane coating and a latex/chalk coating.

5. Coated paper comprising:
   a paper substrate;
   a coating composition disposed on a face of the paper substrate, the coating composition having (a) a coating matrix, and (b) at least one agent in the coating matrix, the agent (i) includes at least one reactive ethylenically unsaturated group, and (ii) is radically polymerizable, wherein the coating matrix, and wherein the coating composition is free or substantially free of residual monomers, residual oligomers, residual photoinitiators, and combinations thereof.

6. The coated paper of claim 5 wherein the coating composition is disposed on the face of the paper substrate at a coat weight within a range of from 0.5 gsm to 30 gsm.

7. The coated paper of claim 5 further comprising:
   a UV curable formulation disposed on at least a portion of the coating composition.

8. The coated paper of claim 7 wherein the UV curable formulation is at least partially cured.

9. The coated paper of claim 7 wherein the UV curable formulation is a UV curable ink.

10. A method of forming a coated paper, the method comprising:
    providing a paper substrate defining at least one face;
    providing a coating composition having (a) at least one agent that (i) includes at least one reactive ethylenically unsaturated group, and (ii) is radically polymerizable, and (b) a coating matrix, wherein the coating composition is free or substantially free of residual monomers, residual oligomers, residual photoinitiators, and combinations thereof;

depositing the coating composition on the face of the paper to thereby form the coated paper.

11. The method of claim 10 wherein the depositing is performed such that the coating composition is deposited at a coat weight within a range of from about 0.2 gsm to about 30 gsm.

12. The method of claim 10 further comprising:
after depositing the coating composition on the face of the paper, at least partially drying the coating composition.

13. The coating composition of claim 1, wherein the coating matrix comprises a latex/chalk coating.

14. The coated paper of claim 5, wherein the coating matrix comprises a latex/chalk coating.

15. The method of claim 10, wherein the coating matrix comprises a latex/chalk coating.

16. The coating composition of claim 1, wherein the coating matrix comprises a combination of a latex/chalk coating and a urethane coating.

17. The coated paper of claim 5, wherein the coating matrix comprises a combination of a latex/chalk coating and a urethane coating.

18. The method of claim 10, wherein the coating matrix comprises a combination of a latex/chalk coating and a urethane coating.

19. The coating composition of claim 1, wherein the coating composition is free of residual monomers, residual oligomers, and residual photoinitiators.

20. The coated paper of claim 5, wherein the coating composition is free of residual monomers, residual oligomers, and residual photoinitiators.

\* \* \* \* \*